J. TORRENT.
Saw Arbors.

No. 153,400. Patented July 21, 1874.

ATTEST:

INVENTOR:

UNITED STATES PATENT OFFICE.

JOHN TORRENT, OF MUSKEGON, MICHIGAN.

IMPROVEMENT IN SAW-ARBORS.

Specification forming part of Letters Patent No. 153,400, dated July 21, 1874; application filed March 13, 1874.

*To all whom it may concern:*

Be it known that I, JOHN TORRENT, of Muskegon, in the county of Muskegon and State of Michigan, have invented an Improvement in Saw-Arbors, of which the following is a specification:

The nature of this invention relates to the construction of a saw-arbor in two parts, the object of which is to enable the saw or saws and pulleys used thereon to be changed, taken off, or put on by simply moving the separated parts of the arbor endwise in the boxes, without disturbing the bearings or any part of the machinery, or lifting the arbor out of the boxes. The invention consists in a two-part arbor secured by a clutch-screw or compression-coupling end to end, with suitable collars for preventing end play in the boxes when the arbor is at work.

Figure 1:
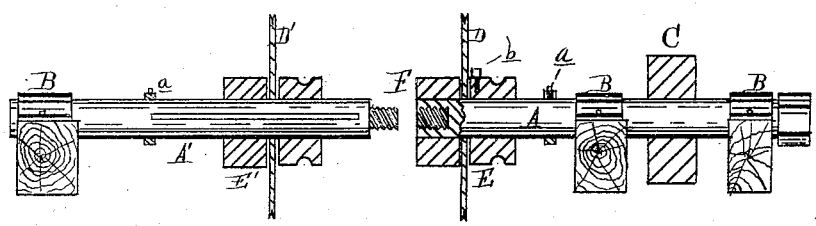
Figure 2:
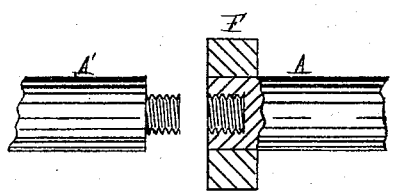

Figure 1 is a sectional side elevation of the arbor of a parallel edger, made in two parts or sections. Fig. 2 is a sectional detail of the coupling.

In the drawing, A A' represent a saw-arbor made in two parts or sections, each section running in a box, B, and provided with a collar, *a*, and set-screw, to restrict their longitudinal movement in said boxes when at work.

The section A runs in two boxes, between which a driving-pulley, C, is keyed on it. D D' are circular saws clamped in collars E E', feathered on the arbor-sections A A', respectively. The collar E may have a set-screw, *b*, to prevent it from being laterally moved. F is a coupling, to unite the contiguous ends of the arbor-sections, the construction of which is clearly shown in Fig. 2. Any other form of coupling may be used.

To change or remove any saw or pulley on the arbor, the sections are uncoupled, and the arbor-collar *a* of the sections A' loosened, to permit the latter to be moved longitudinally in its box, when the saw or pulley may be taken off or put on the arbor between its inner ends.

What I claim as my invention, and desire to secure by Letters Patent, is—

A saw-arbor wherein the two sections A A', the boxes B, the collars E, and the coupling F are constructed and arranged substantially as described and shown.

JOHN TORRENT.

Witnesses:
B. WAIT,
H. J. HOYT.